Dec. 15, 1931.    J. B. STRAUSS    1,836,345
EYEBAR AND PROCESS OF FABRICATING THE SAME
Filed July 15, 1927
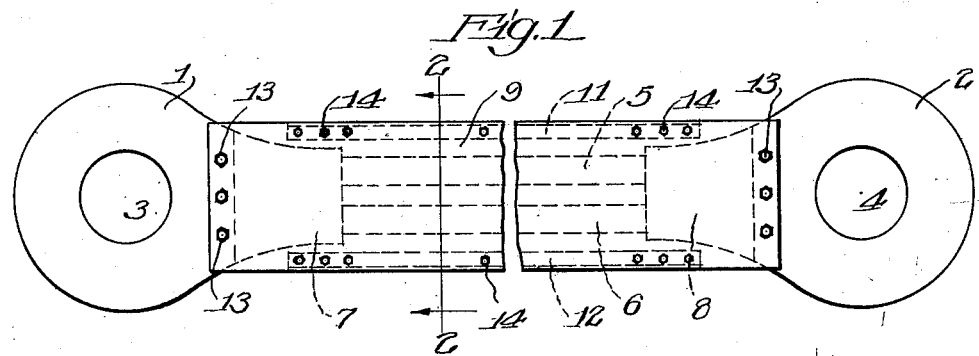
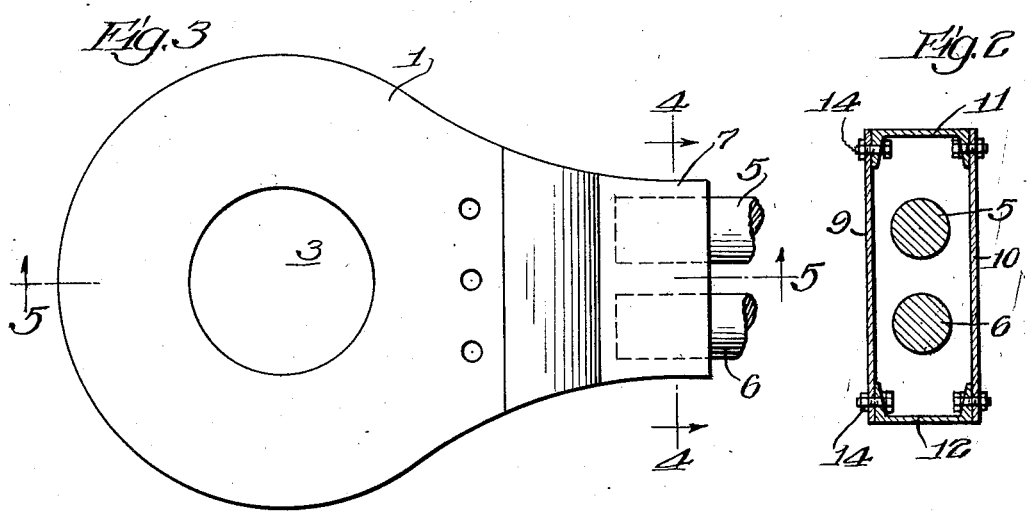
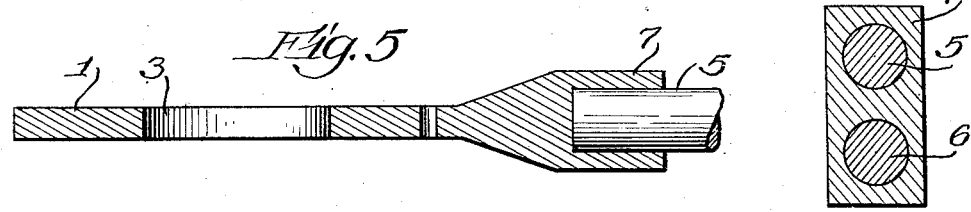
Inventor
Joseph B. Strauss
By Parker & Carter attys Patented Dec. 15, 1931

1,836,345

UNITED STATES PATENT OFFICE

JOSEPH B. STRAUSS, OF CHICAGO, ILLINOIS

EYEBAR AND PROCESS OF FABRICATING THE SAME

Application filed July 15, 1927. Serial No. 205,882.

This invention relates to eye bars for use in building structures such as bridges and the like and the process of fabricating the same and has for its object to provide a new and improved device of this description.

The invention has as a further object to provide an eye bar which shall be light and yet have great strength.

The invention has as a further object to provide an eye bar as a tension member for bridges and the like.

The invention has as a further object to provide a process for fabricating eye bars so that they may be easily and quickly erected in the structure with which they are used.

The invention has other objects which are more particularly pointed out in the accompanying description.

Referring now to the drawings, Fig. 1 is a view showing one form of the invention.

Fig. 2 is a sectional view taken on line 2—2 of Fig. 1.

Fig. 3 is a view showing one of the eye bar heads with portions of the cable attached thereto.

Fig. 4 is a sectional view taken on line 4—4 of Fig. 3.

Fig. 5 is a sectional view taken on line 5—5 of Fig. 3.

Like numerals refer to like parts throughout the several figures.

In carrying out my invention I provide two rigid eye bar heads 1 and 2 of metal provided with holes 3 and 4 for the pins by means of which the eye bars are held in position in the structure. Attached to these eye bar heads are a plurality of cables 5 and 6, said cables being permanently fastened to the eye bar heads and connecting them together to form a completed eye bar.

In the construction shown, the eye bar heads are provided with projecting ends 7 and 8. These ends are provided with holes into which the ends of the cables are received. The ends are then compressed preferably under heat so as to unite the cables and the eye bar heads into a permanent structure.

The eye bar heads are then connected together by stiffening members such as the removable side plates 9 and 10 and the top and bottom connecting members 11 and 12. The side plates are removably connected to the eye bar heads by the removable fastening devices such as the bolts 13 and the connecting members are fastened to the side plates by the removable fastening members such as the bolts 14. These stiffening members hold the eye bar heads in their proper extended position for shipping and for installation in the structure in connection with which the eye bars are used. At any time desired, preferably after the eye bars have been installed, the plates 9 and 10 and members 11 and 12 are removed. It will thus be seen that I have here an eye bar which has great strength per unit of weight and which can be easily and cheaply manufactured and erected.

I claim:—

1. An eyebar comprising two eyebar heads each having one dimension greater than the other and a series of cables permanently connected with said heads and spaced along the greater dimension.

2. An eyebar comprising two eyebar heads, said heads being flat in form and having pin holes therein, and a series of cables permanently connected with said heads.

3. A cable eyebar comprising two rigid eyebar heads and a flexible connecting bar between them the eyebar heads having flattened portions, the thickness of the flattened portions being less than the diameter of said flexible connecting bar.

4. A cable eyebar comprising two rigid eyebar heads and a flexible connecting bar, said flexible connecting bar comprising a series of cables having their ends projecting part way into the rigid eyebar heads.

5. A cable eyebar comprising two rigid eyebar heads, a flexible connecting bar and a stiff device connecting the two eyebar heads to permit shipment and erection.

6. A cable eyebar comprising two rigid eyebar heads, a flexible connecting bar and a removable stiff casing connecting the two eyebar heads to permit shipment and erection, said casing enclosing and protecting the flexible connecting bar during shipment.

7. An eye bar comprising two rigid eye bar heads, a flexible connecting bar and a removable stiff device connecting the two eye bar heads to permit shipment and erection, the ends of said stiff device projecting part way along the eye bar heads and removable fastening devices passing through said ends and through the eye bar heads.

Signed at Chicago, county of Cook, and State of Illinois, this seventh day of July, 1927.

JOSEPH B. STRAUSS.